US008376223B2

(12) United States Patent
Woronec

(10) Patent No.: US 8,376,223 B2
(45) Date of Patent: Feb. 19, 2013

(54) METHOD AND APPARATUS FOR SECURELY ACTIVATING A CREDIT CARD FOR A LIMITED PERIOD OF TIME

(76) Inventor: John S. Woronec, Lambertville, MI (US)

( * ) Notice: Subject to any disclaimer, the term of this patent is extended or adjusted under 35 U.S.C. 154(b) by 629 days.

(21) Appl. No.: 12/384,495

(22) Filed: Apr. 6, 2009

(65) Prior Publication Data

US 2010/0155470 A1 Jun. 24, 2010

Related U.S. Application Data

(60) Provisional application No. 61/140,234, filed on Dec. 23, 2008.

(51) Int. Cl.
*G06K 5/00* (2006.01)
(52) U.S. Cl. ..... 235/380; 235/375; 235/379; 455/556.1; 455/557
(58) Field of Classification Search .......... 235/375, 235/379, 380, 487, 492, 493, 494, 435, 449; 455/418, 556.1, 557
See application file for complete search history.

(56) References Cited

U.S. PATENT DOCUMENTS

| 2004/0058705 | A1 | 3/2004 | Morgan et al. | |
|---|---|---|---|---|
| 2004/0204120 | A1* | 10/2004 | Jiles | 455/564 |
| 2005/0194436 | A1* | 9/2005 | McCaskey et al. | 235/380 |
| 2006/0213971 | A1* | 9/2006 | Kelley et al. | 235/380 |
| 2007/0034690 | A1 | 2/2007 | Schilling | |
| 2007/0057037 | A1 | 3/2007 | Woronec | |
| 2007/0073619 | A1 | 3/2007 | Smith | |
| 2008/0120707 | A1 | 5/2008 | Ramia | |
| 2008/0217400 | A1 | 9/2008 | Portano | |

OTHER PUBLICATIONS

International Search Report and Written Opinion of the International Searching Authority for PCT/US 10/01665, dated Sep. 30, 2010.

* cited by examiner

*Primary Examiner* — Daniel Hess
*Assistant Examiner* — Tabitha Chedekel
(74) *Attorney, Agent, or Firm* — Marshall & Melhorn LLC

(57) ABSTRACT

An apparatus and methods securely activate a credit or debit card for a single purchase, a predetermined amount of time, or a predetermined amount of purchases in a predetermined amount of time, while utilizing a portable phone, especially a cell phone, having a card reader. Only transactions using the electronic telephone number and electronic serial number of the cell phone being used, along with preselected information identifying the owner of a swiped card will be authorized to perform credit and debit card transactions, thus providing secured transactions. Current card magnetic strips and possibly magnetic or other type of strips that are smaller in size and closer to the edge of the credit or debit card are serviced.

21 Claims, 4 Drawing Sheets

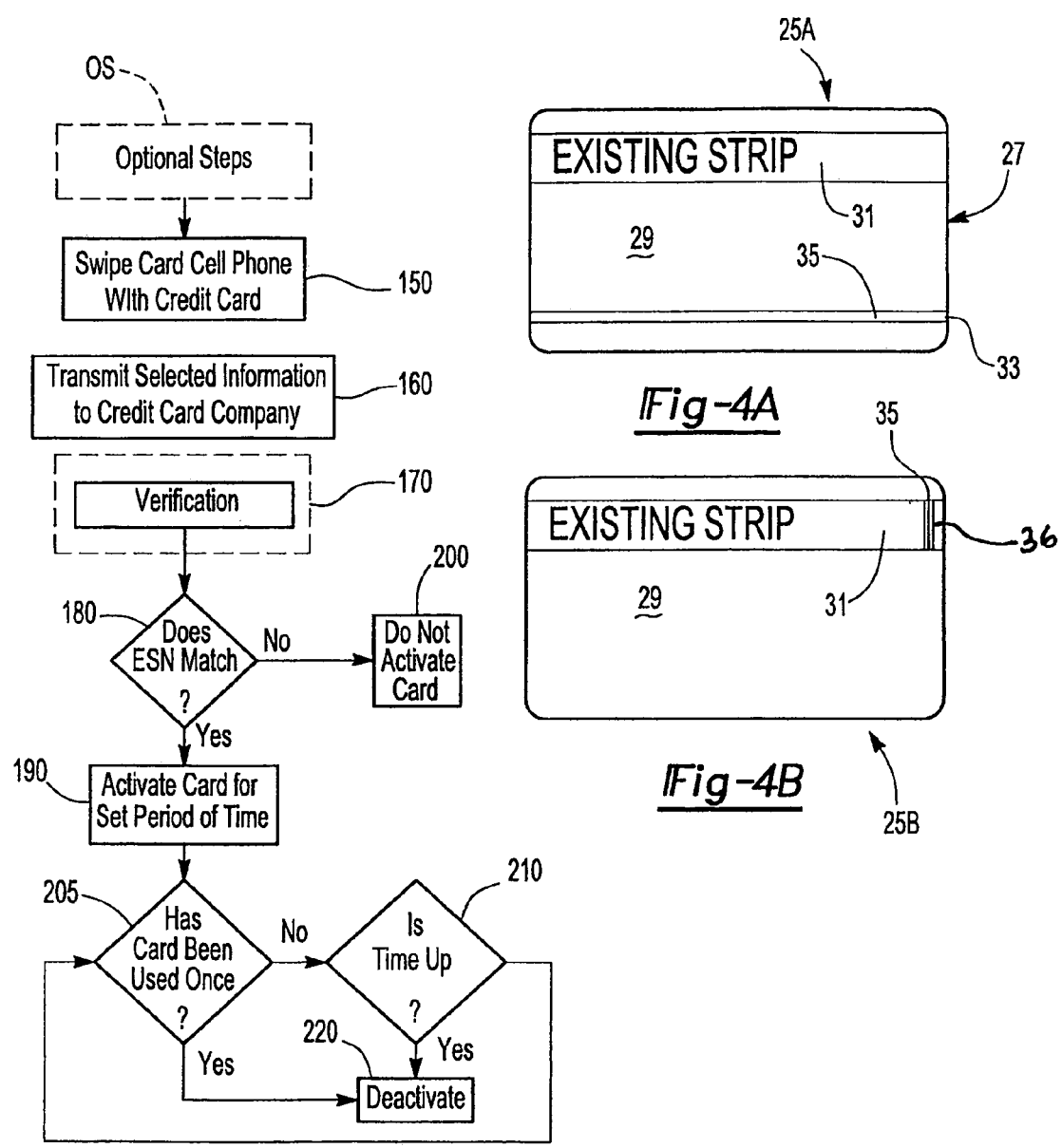

METHOD AND APPARATUS FOR SECURELY ACTIVATING A CREDIT CARD FOR A LIMITED PERIOD OF TIME

CROSS REFERENCE TO RELATED APPLICATION

This application claims priority, under 35 U.S.C. §119(e), from the U.S. Provisional patent application Ser. No. 61/140,234, filed Dec. 23, 2008, for Method and Apparatus for Securely Activating a Credit Card For a Limited Period of Time. Application Ser. No. 61/140,234 is at the time of filing the present application. Application Ser. No. 61/140,234 is incorporated herein by reference in its entirety.

BACKGROUND OF THE INVENTION

1. Field of the Invention

The present invention relates generally to the field of credit or debit card security. More particularly, the present invention relates to a simplified method for providing credit card or debit card security. Most particularly, the present invention relates to a credit card or debit card having identifying or pre-selected information identifying the owner or holder of the credit card or debit card, and a cell phone having identifying information specific to the cell phone. When it is desired to make a purchase, the cardholders credit or debit card is swiped through the cell phone, which transmits the identifying or pre-selected information identifying the owner, together with identifying information specific to the cell phone, to the credit card or debit card issuer or designee. The credit card or debit card issuer or designee will determine what the identifying information specific to the cell phone of the owner is, and compare it to the identifying information specific to the cell phone which transmitted the information, and if they are the same, the owner's card was swiped in the owner's phone, and a purchase will be authorized.

2. Description of the Prior Art

Credit cards, and more recently debit cards, have been in use in the United States and around the world. The unauthorized or fraudulent use of such credit or debit cards for goods and services has been with the credit card and bankcard industry ever since the inception of the credit or debit card. Much of the problem of fraudulent use of such cards is due to the fact that all the information on the front of the credit card or debit card has also been contained on a magnetic stripe on the back of the card having one or more, but typically three, tracks for storing all the personal and credit card information.

This is convenient for present day card reading systems, but can be decoded rather easily by one wishing to practice credit card fraud. Consequently, it is easy to use this information to create illegally any number of credit cards containing the user's personal information. Many solutions have been offered to solve the problem of credit card and bankcard fraud and theft, and all of them are becoming more and more complicated, and require completely revamping or replacing existing magnetic card readers.

U.S. Pat. No. 4,614,816 to Pavlov, et al. shows a unitary self-contained card which does not require interaction with a fixed terminal device to prevent monitoring of confidential information contained with the card personal identification number ("PIN"). The unitary self-contained card has the ability to verify a PIN, which is entered directly into the card by way of a keyboard.

U.S. Pat. No. 4,868,376 to Lessin, et al., shows an intelligent, portable, interactive personal data system having a microprocessor with memory contained in the credit or debit card housing. An alphanumeric keypad and display is located on a surface of the housing.

U.S. Pat. No. 6,095,416 to Grant, et al., shows an authorization card, such as a credit card or debit card, having a security feature. The authorization card generally has two operational states, a disabled state and enabled state. In the disabled state, which is the default mode of operation, access to confidential information stored on the card is denied. The card remains in the disabled state until a PIN code is entered on a keypad provided on the card. Once the card is enabled, access to the confidential information is permitted for a predetermined period of time.

U.S. Pat. No. 6,257,486 B1 to Tiecher, et al., shows a smart card having a microprocessor contained within the card, with the user's PIN entered directly into the smart card and authenticated directly by the smart card itself, and not propagated outside the smart card.

U.S. Pat. No. 6,811,082 B2 to Wong describes a novel bridge device to link the world of smart cards to that of magnetic finance cards.

U.S. Pat. No. 6,816,058 B2 to MacGregor, et al. shows a card where a biometric sensor device is integrated into the credit card or debit card.

All of the above devices decrease the possibility of fraudulent debit or credit card use, but certainly do not eliminate it, because they all use electronic devices which can be decoded by one who is intent on credit card fraud. They are also relatively expensive. The aforementioned U.S. Pat. No. 6,257,486 B1 discusses in detail the security problems of so-called "smart" cards.

U.S. Pat. No. 7,210,621 B2 to Woronec shows a method and apparatus for providing a secure credit card which involves generating random questions which must be answered by the card holder based on the position of certain information on the credit card or debit card.

U.S. Pat. No. 7,363,252 B2 shows the use of a portable telephone having a barcode reader to make a purchase by reading a barcode on a product and entering a password on the keypad.

SUMMARY OF THE INVENTION

In order to solve the above described problems in the prior art, the present invention provides a method of securely activating a credit card or debit card for a single purchase, a predetermined amount of time, or a predetermined amount of purchases in a predetermined amount of time.

In one embodiment of the present invention there is provided a method of securely activating a credit card or debit card for a limited period of time comprising the steps of:
  a) swiping an inactive credit card or debit card through a cell phone having a credit card or debit card reader and identifying information specific to the cell phone;
  b) having the credit card or debit card reader read preselected information identifying the owner of the swiped card from at least one magnetic stripe provided on the credit card or debit card;
  c) having the card reader cause the cell phone to transmit at least a portion of the preselected information, and the specific identifying information, to the credit card or debit card issuer or its designee;
  d) determining from the at least a portion of the preselected information the identity of the card owner;
  e) determining what the specific identifying information of the card owner's cell phone should be;

f) matching the specific identifying information transmitted by the cell phone with the specific identifying information of the card owner's cell phone;
g) activating the swiped credit card if the specific identifying information transmitted by the cell phone matches the specific identifying information of the card owner's cell phone.

In another embodiment of the present invention there is provided a method of securely activating a credit card or debit card for a limited period of time comprising the steps of:
a) providing a cell phone having a credit card or debit card reading capability;
b) swiping a credit card or debit card through a cell phone having a credit card or debit card reader;
c) having the credit card or debit card reader read preselected information identifying the owner of the swiped card from at least one magnetic stripe provided on the credit card or debit card;
d) having the card reader cause the cell phone to transmit at least a portion of the preselected information to the credit card or debit card issuer or its designee, together with identifying information specific to the cell phone;
e) determining from the at least a portion of the preselected information the identity of the card owner;
f) determining what the identifying information specific to the card owner's cell phone should be;
g) matching the identifying information specific to the cell phone transmitted by the cell phone with the identifying information specific to the card owner's cell phone; and
h) activating the inactive credit card or debit card for a set period of time if the identifying information specific to the cell phone transmitted by the cell phone matches the electronic serial number of the card owner's cell phone.

In a still further embodiment of the present invention there is shown a method of securely activating a credit card or debit card comprising the steps of:
a) providing an inactive credit card or debit card;
b) providing a cell phone having a credit card or debit card reading capability and identifying information specific to the cell phone;
c) swiping the inactive credit card or debit card through the cell phone having a credit card or debit card reading capability;
d) having the cell phone having a credit card or debit card reading capability read preselected information identifying the owner of the swiped card from at least one magnetic stripe provided on the credit card or debit card;
e) having the cell phone having a credit card or debit card reading capability transmit at least a portion of the selected information and identifying information specific to the cell phone to the credit card or debit card issuer or its designee;
f) determining from the at least a portion of the selected information the identity of the card owner;
g) determining what the identifying information specific to the cell phone of the card owner's cell phone should be;
h) matching the identifying information specific to the cell phone transmitted by the cell phone with the identifying information specific to the cell phone of the card owner's cell phone; and
i) activating the swiped credit card or debit card if the identifying information specific to the cell phone transmitted by the cell phone matches the identifying information specific to the cell phone of the card owner's cell phone.

BRIEF DESCRIPTION OF THE DRAWINGS

FIG. 3C is a flow chart illustrating a method embodying a still further modification of the present invention.

FIG. 4A is a top plan view of a construction embodying the present invention.

FIG. 4B is a top plan view of a construction embodying a modification of the present invention.

DETAILED DESCRIPTION OF THE PREFERRED EMBODIMENTS

The following definitions of terms will apply throughout the specification and claims of the present application.

"Inactive Card" means a credit card or debit card which, when swiped in a traditional credit authorization system, will not be able to make a purchase.

"Active Card" means a credit card or debit card which, when swiped in a traditional credit authorization system, will be able to make a purchase.

"To Activate A Previously Inactive Card" means to change an "inactive card" to an "active card".

"Traditional Credit Authorization System" means" a credit card or debit card authorization system such as used in department stores, gas stations, and the like, at the time of the invention.

Figure 1:
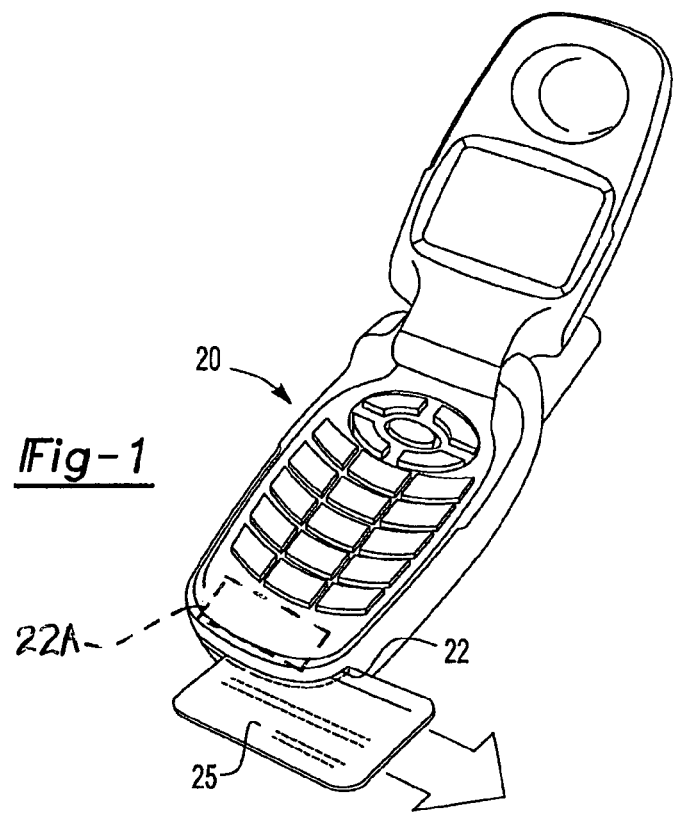
FIG. 1 is a perspective view of a construction embodying the present invention.

Referring now to FIG. 1, there is shown a portable phone 20 having a novel credit card and/or debit card reader 22A. Throughout the instant invention, such a portable phone will be designated as a cell phone 20, but may be embodied as any portable telephone, like a portable phone that is used in conjunction with a telephone land line. Such a present day portable phone may be such as those manufactured by Samsung Electronics Co., Limited, Sanyo Electric Co., Ltd., LG Electronics Inc., Arima Communications Corporation, Curitel Communications, Inc, Seimens Aktiengesellschaft, which is modified to have the novel credit card or debit card reader 22A with the provision of a card slot 22, programmed to read credit and debit cards in the manner that they are read when swiped through present day card readers such as those manufactured by Magtek, Verifone, Exadigm, and which are found in restaurants, gas stations, department stores and the like. It is well within the skill of those in the art to provide the cell phone 20 with card slot 22, and card reader 22A, and to program them to operate in the manner described below.

When the cardholder desires to make a purchase, an inactive card 25 is swiped through the slot 22 provided in the cell phone 20. Since, physically there is no difference between an "inactive card" and an "active card", the numeral 25 will be used for both.

However, the exact form of the card 25 may differ. Therefore, for the description of the card in FIGS. 4A and 4B, the prefixes 25A & 25B will be used. First, referring to FIG. 4A, the rear or back side of a conventional credit or debit card is illustrated. The card body 27 may be of any substrate 29 used to produce the first type credit or debit card 25A. The existing magnetic strip 31 may be identical to that found in present day credit or debit cards. Typically, the magnetic strip 31 runs the length of the card 25A and is located 0.223 inches (5.66 mm) from the edge of the card, and is 0.375 inches (9.52 mm) wide, while containing three tracks, each 0.110 inches (2.79 mm) wide.

Since the present invention involves swiping a credit or debit card through a slot provided in a cell phone, and many, if not all, cell phones will not be able to accommodate a slot deep enough to enable reading of the existing magnetic strip or stripe 31, it may be desirable to provide a second magnetic strip, stripe or media 33 on the card 25A which could be read in a much shallower slot which would be less than 0.223 inches (5.66 mm) from the edge of the card and may be less than 0.375 inches (9.52 mm) wide, while being parallel to the existing magnetic strip or stripe 31. The information needed to practice the present invention, i.e., the identifying of pre-selected information 35 identifying the owner, which will be described in more detail below, would be contained in a second magnetic strip 33, instead of the existing strip 31.

The second magnetic strip 33 may be of a conventional type, such as the existing strip 31, or maybe of any type which will produce readable magnetic impulses. It is preferably placed proximate to the bottom of the first card 25A and parallel to the existing strip 31, but it is well within the scope of the present invention to have another placement. The identifying or pre-selected information identifying the owner 35 is contained in the second magnetic strip 33.

With reference to FIG. 4B, a second card 25B is illustrated. Again, the rear or backside of the second card 25B is illustrated. This time the existing strip 31 has been modified by putting the identifying or pre-selected information identifying the owner 35 in a preselected position on the existing strip 31. The additional or special information 35 is preferably placed near one edge of the second card 25, and is indicated in dotted lines. In this manner, the shorter edge of the card 25B may be swiped in a shallower slot.

Because the trends in designing of cell phones 20 are to make them thinner and smaller, the slot 22 through which the card 25 is read may be much shallower than in existing credit card or debit card authorization systems. By placing the special information 35 on a second magnetic strip 33 or in a preselected position 36, which may be perpendicular to the existing strip 31, where either the second strip 33 or the preselected position 36 is nearer (i.e., less a 0.223 inches) to the any edge of the card 25, the present invention may be utilized with much shallower slots 22 of the card reader 22A in the cell phone 20.

The identifying or pre-selected information identifying the owner 35 which must be provided on the card 25 to permit the practice of the present invention preferably consists of the minimum information necessary to identify the card holder to the credit card or debit card issuer. This minimum information may include an optional personal identification number (PIN) that the card user would be asked to provide, prior to, during, or after, transmission of the minimum information to the credit card or debit card issuer. The cell phone 20 will then transmit this information to the credit or debit card issuer or its designee, along with identifying information specific to the cell phone which transmitted the information.

The credit or debit card issuer, or its designee, using the identifying or pre-selected information identifying the owner 35, will determine identifying information specific to the cell phone of the owner. The identifying information specific to the cell phone which transmitted the information will be compared to the identifying information specific to the cell phone of the owner. If the information matches, it is known that the card holder swiped his card through his cell phone, and the previously inactive card will be activated, i.e. a purchase can be authorized through the credit card or debit card issuer's normal authorization process because the credit card or debit card issuer will make the necessary programming or other changes in its authorization system to permit a purchase to be made. In some applications it may be desirable to have the cell phone 20 additionally transmit the cardholder's telephone number for comparison purposes.

Figure 2:
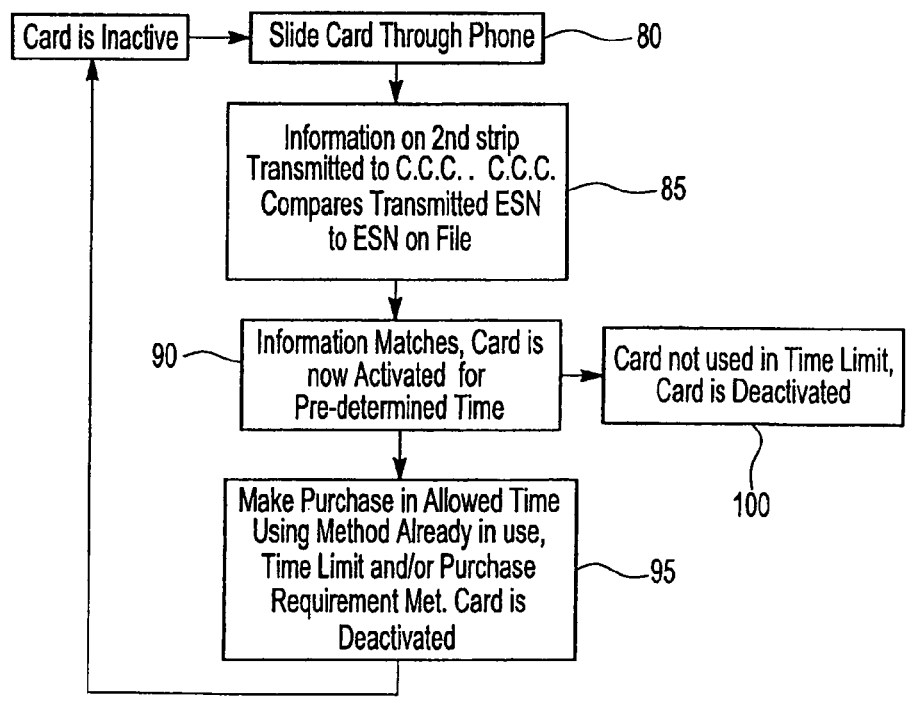
FIG. 2 is a flow chart illustrating a method embodying the present invention.

The method of the present invention, in its most basic form, is shown in FIG. 2. An inactive card 25 is swiped through the slot 22 in the cell phone 20 (Box 80), and the information 35 (identifying or pre-selected information identifying the owner) on the second strip 33 (see FIG. 4A) or in the special position 36 on the existing strip 31 (see FIG. 4B) is transmitted to the credit card or debit card company (Box 85), along with the identifying information specific to the cell phone which transmitted the information.

For purposes of illustration, the following examples will refer to the identifying information specific to the cell phone which transmitted the information as the electronic serial number (ESN) of the telephone doing the transmitting, and the identifying information specific to the cell phone of the owner as the electronic serial number of the cardholder's cell phone (ESNO) as determined by the credit card or debit card issuer or its designee from the identifying or pre-selected information identifying the owner 35.

Using the identifying or pre-selected information 35 identifying the card owner, which may include a PIN, the credit card or debit card issuer or its designee determines the ESNO of the card holders cell phone. A comparison is then made which compares the ESN of the cardholder's cell phone with the ESNO of the cell phone which transmitted the information.

If the electronic serial number of the card holders cell phone matches the electronic serial number of the phone doing the transmitting, the previously inactive credit card or debit card 25 is activated for a predetermined period of time (Box 90). During this time, the cardholder may make purchase(s) in the allowed time using a credit card or debit card authorization system already in use (Box 95). If the card is not used within the predetermined period of time, the card is deactivated (Box 100).

Figure 3A:
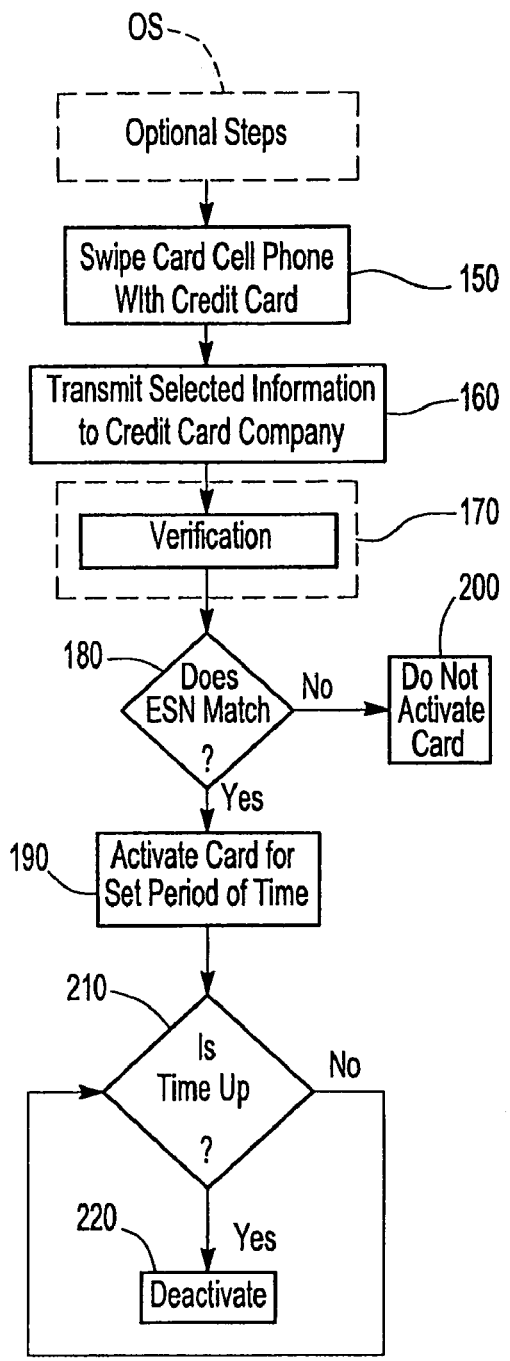
FIG. 3A is a flow chart illustrating a method embodying a modification of the present invention.
Figure 3B:
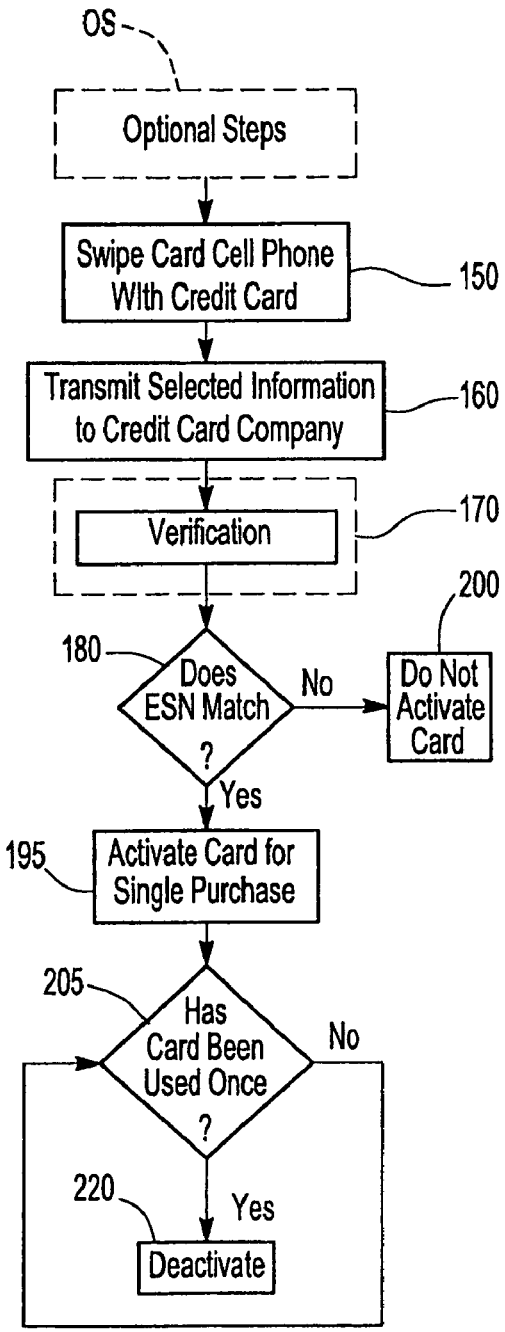
FIG. 3B is a flow chart illustrating a method embodying a further modification of the present invention.

Several variations of the method Illustrated in FIG. 2 are well within the scope of the present invention, and some are illustrated in FIG. 3A-3C. Since many of the steps are similar, like steps will be indicated with like box numbers. Referring first to FIG. 3A, an inactive card 25 is swiped through the slot 22 in the cell phone 20 (Box 150). The identifying or pre-selected information identifying the owner 35 is transmitted to the credit card or debit card company (Box 160). A verification step is then next performed (Box 170).

Figure 5A:
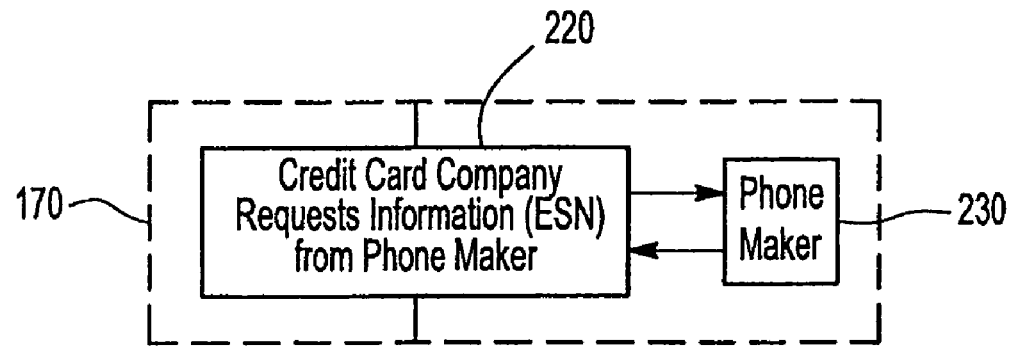
FIG. 5A is a block diagram illustrating one way of performing the verification step of FIGS. 2A-2C.
Figure 5B:
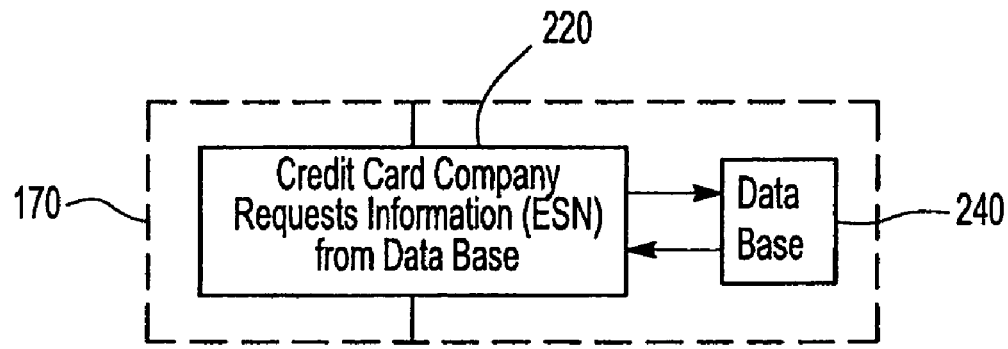
FIG. 5B is a view similar in part to FIG. 5A, but showing a modification of the verification step of FIGS. 2A-2C.

Referring now to FIGS. 5A-5B, the verification step 170 will either involve the credit card or debit card company requesting information (Box 220) from the phone maker (Box 230), or the credit card or debit card company requesting information (Box 220) from a database (Box 240).

Returning now to FIG. 3A, a comparison will be made (Box 180) during which it will be determined whether the electronic serial number of the phone doing the transmitting matches the electronic serial number of the cardholder's phone, as determined by the credit or debit card issuer or its designee.

If the electronic serial number of the cardholder's cell phone matches the electronic serial number and or telephone number of the telephone 20 doing the transmitting, the credit card or debit card 25 will be activated for a set period of time (Box 190). The method will continuously inquire if the time is up. If the time is up, the previously active card 25 will be deactivated (Box 220). If the time is not up, the system will continue inquiring until the time is up.

The method illustrated in FIG. 3B is similar in large part to the method just illustrated in FIG. 3A. However, instead of the inactive card 25 being activated for a set period of time, the inactive card 25 is activated for a single purchase without regard to time. Steps indicated by the box numbers 150, 160, 170, 180 and 200 in FIG. 3B may be substantially identical to the like numbered steps in FIG. 3A indicated by the box numbers 150, 160, 170, 180 and 200. However, once it has been determined that the electronic serial number of the telephone doing the transmitting matches the electronic serial number of the cardholder's cell phone (Box 180) the previously inactive card 25 is activated for a single purchase (Box 195) and then the method will continuously inquire if the card has been used once (Box 205), and if it has been, the now active card 25 will be de-activated. If the active card 25 has not been used once, the system will continue to loop until the question is answered in the affirmative, at which time the active card 25 will be deactivated.

The method of the invention illustrated in FIG. 3C is a combination of the methods illustrated in FIGS. 3A and 3B. Again, the steps indicated by the box numbers 150, 160, 170, 180 and 200 are identical. However, once it has been determined that the electronic serial number of the telephone doing the transmitting matches the electronic serial number of the cardholder's cell phone (box 180), this modification of the method of the present invention will activate the previously inactive card 25 for a set period of time (Box 190) and the method of the present invention will then inquire, has the activated card 25 been used once (Box 205)? If it has, the method will then deactivate the card 25 (Box 220). However, if the card has not been used once the method will continue to inquire, is the time up (Box 210)? If the time is not up, the method will continue to loop through boxes 205 and 210 until the card has either been used once, or the time is up, and the previously active card 25 will then be deactivated.

Figure 6:
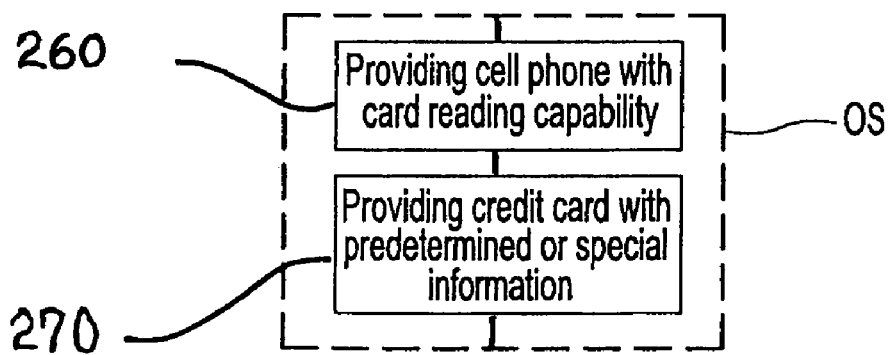
FIG. 6 is a block diagram showing optional steps (OS) which may be used in the methods shown in FIGS. 2, 3A, 3B and 3C.

The method of the present invention, if desired, can be expanded to include the step of providing a cell phone 20 having credit card or debit card reading capabilities (Box 260), and the the step of providing the credit card or debit card 25 having identifying or pre-selected information identifying the owner 35 provided either on the existing strip 31, or on the second magnetic strip 33, or, in the case of a PIN, to be included with the special information provided by the user of the phone at the time of the transaction (Box 270). If the method is so expanded, one, or all, of these steps would simply appear before Box 80 of FIG. 2 or box 150 of FIGS. 3A-3C. These steps are illustrated in FIG. 6.

By carefully studying the problems associated with providing security for credit card or debit card purchases which does not involve a wholesale replacement of present-day systems I have provided a novel, easy to implement, and very cost effective credit card security system.

I claim:

1. A method of securely activating a credit card or debit card having a standard magnetic strip for a limited period of time comprising the steps of:
    a) swiping a previously inactive credit card or debit card through a cell phone having an integral credit card or debit card reader and identifying information specific to the cell phone in the form of an electronic serial number and/or phone number;
    b) having the integral credit card or debit card reader read preselected information identifying the owner of the swiped card from at least one magnetic stripe provided on the credit card or debit card;
    c) having the integral credit card or debit card reader cause the cell phone to transmit at least a portion of the preselected information, and the specific identifying information, to the credit card or debit card issuer or its designee;
    d) determining from the at least a portion of the preselected information the identity of the card owner;
    e) determining what the specific identifying information of the card owner's cell phone should be;
    f) matching the specific identifying information transmitted by the cell phone with the specific identifying information of the card owner's cell phone;
    g) activating the swiped credit card or debit card if the specific identifying information transmitted by the cell phone matches the specific identifying information of the card owner's cell phone.

2. The method defined in claim 1, wherein the specific identifying information is the telephone number and/or electronic serial number of the cell phone.

3. The method defined in claim 2, wherein the step of activating the card comprises the step of activating the card for a single purchase.

4. The method defined in claim 2, wherein the step of authorizing purchases to be made comprises the step of authorizing a predetermined number of purchases to be made.

5. The method defined in claim 2, wherein the step of activating the card comprises the step of activating the card for a set period of time.

6. The method defined in claim 2, wherein the step of determining what the telephone number and/or electronic serial number of the card owner's cell phone should be comprises looking up the telephone number and/or electronic serial number in a look-up table.

7. The method defined in claim 2, wherein the step of determining what the electronic serial number of the card owner's cell phone should be comprise the steps of:
    a) transmitting a request to the cell phone manufacturer for the telephone number and/or electronic serial number of the card owner's cell phone and receiving back the requested information.

8. The method defined in claim 2, wherein the step of having the integral credit card or debit card reader read preselected information from the at least one magnetic stripe provided on the credit card or debit card comprises having the credit card or debit card reader initially read only information provided on a second, separate and distinct, magnetic stripe on the credit card or debit card and sending the telephone number and/or electronic serial number of the owner's cell phone to the credit card or debit card issuer or its designee.

9. The method defined in claim 1, wherein the preselected information identifying the owner of the swiped card includes a personal identification number (PIN).

10. A method of securely activating a credit card or debit card for a limited period of time comprising the steps of:
    a) providing a cell phone having an integral or built in credit card or debit card reading capability;
    b) swiping a credit card or debit card through the cell phone having an integral or built in credit card or debit card reader;
    c) having the integral or built in credit card or debit card reader read preselected information identifying the owner of the swiped card from at least one magnetic stripe provided on the credit card or debit card;
    d) having the integral or built in card reader cause the cell phone to transmit at least a portion of the preselected information to the credit card or debit card issuer or its designee, together with identifying information specific to the cell phone;

e) determining from the at least a portion of the preselected information the identity of the card owner;

f) determining what the identifying information specific to the card owner's cell phone should be;

g) matching the identifying information specific to the cell phone transmitted by the cell phone with the identifying information specific to the card owner's cell phone;

h) activating the inactive credit card or debit card for a set period of time if the identifying information specific to the cell phone transmitted by the cell phone matches the electronic serial number of the card owner's cell phone.

11. The method defined in claim 10, wherein the identifying information specific to the cell phone is a telephone number and/or the electronic serial number of the respective cell phone.

12. The method defined in claim 11, wherein the step of authorizing purchases to be made comprises the step of authorizing only a single purchase to be made in a set period of time.

13. The method defined in claim 11, wherein the step of authorizing purchases to be made comprising the step of authorizing a predetermined number of purchases to be made.

14. The method defined in claim 11, wherein the step of authorizing purchases to be made comprises the step of authorizing purchases to be made for a set period of time.

15. The method defined in claim 11, wherein the preselected information identifying the owner of the swiped card includes a personal identification number (PIN).

16. A method of securely activating a credit card or debit card for a limited period of time comprising the steps of:

a) providing an inactive credit card or debit card;

b) providing a cell phone having a built in credit card or debit card reading capability and identifying information specific to the cell phone;

c) swiping the inactive credit card or debit card through the cell phone having a credit card or debit card reading capability;

d) having the cell phone having a credit card or debit card reading capability read preselected information identifying the owner of the swiped card from at least one magnetic stripe provided on the credit card or debit card;

e) having the cell phone having a credit card or debit card reading capability transmit at least a portion of the selected information and identifying information specific to the cell phone to the credit card or debit card issuer or its designee;

f) having the credit card or debit card issuer or its designee determine from the at least a portion of the selected information the identity of the card owner;

g) having the credit card or debit card issuer or its designee determine what the identifying information specific to the cell phone of the card owner's cell phone should be;

h) having the credit card or debit card issuer or its designee match the identifying information specific to the cell phone transmitted by the cell phone with the identifying information specific to the cell phone of the card owner's cell phone;

i) activating the swiped credit card or debit card if the identifying information specific to the cell phone transmitted by the cell phone matches the identifying information specific to the cell phone of the card owner's cell phone.

17. The method defined in claim 16, wherein identifying information specific to the cell phone is the telephone number and/or electronic serial number of the respective cell phone.

18. The method defined in claim 17, wherein the step of activating the swiped card comprises the step of activating the swiped card for a single purchase.

19. The method defined in claim 17, wherein the step of authorizing purchases to be made comprises the step of authorizing a predetermined number of purchases to be made in a set period of time.

20. The method defined in claim 17, wherein the step of authorizing purchases to be made comprises the step of authorizing purchases to be made for a set period of time.

21. The method defined in claim 16, wherein the preselected information identifying the owner of the swiped card includes a personal identification number (PIN).

* * * * *